(12) United States Patent
Hsieh et al.

(10) Patent No.: US 7,121,832 B2
(45) Date of Patent: Oct. 17, 2006

(54) THREE-DIMENSIONAL SURGERY SIMULATION SYSTEM

(75) Inventors: Ming-Shium Hsieh, Taipei (TW); Ming-Dar Tsai, Chung-Li (TW)

(73) Assignee: Taipei Medical University, Taipei (TW)

( * ) Notice: Subject to any disclaimer, the term of this patent is extended or adjusted under 35 U.S.C. 154(b) by 497 days.

(21) Appl. No.: 10/379,135

(22) Filed: Mar. 4, 2003

(65) Prior Publication Data

US 2004/0043368 A1 Mar. 4, 2004

(30) Foreign Application Priority Data

Aug. 30, 2002 (TW) ............................... 91119869 A

(51) Int. Cl.
*G09B 23/28* (2006.01)
(52) U.S. Cl. .................. 434/262; 434/267; 434/307 R; 345/6; 345/419
(58) Field of Classification Search ................ 434/262, 434/267, 307 R, 308, 365; 345/419, 426; 700/121; 600/407; 348/58; 703/6, 7; 433/213; 382/128
See application file for complete search history.

(56) References Cited

U.S. PATENT DOCUMENTS

| | | | | |
|---|---|---|---|---|
| 5,768,134 | A * | 6/1998 | Swaelens et al. ............ 700/121 |
| 5,793,375 | A * | 8/1998 | Tanaka ........................ 345/426 |
| 5,855,553 | A * | 1/1999 | Tajima et al. ................ 600/407 |
| 6,011,581 | A * | 1/2000 | Swift et al. .................... 348/58 |
| 6,514,082 | B1 * | 2/2003 | Kaufman et al. ............ 434/262 |
| 6,714,901 | B1 * | 3/2004 | Cotin et al. ...................... 703/7 |
| 6,857,878 | B1 * | 2/2005 | Chosack et al. ............. 434/267 |
| 2002/0035458 | A1 * | 3/2002 | Kim et al. ........................ 703/6 |
| 2002/0168618 | A1 * | 11/2002 | Anderson et al. ............ 434/262 |
| 2004/0070583 | A1 * | 4/2004 | Tsai et al. .................... 345/419 |
| 2004/0254771 | A1 * | 12/2004 | Riener et al. ................... 703/7 |
| 2004/0259057 | A1 * | 12/2004 | Kim ............................. 433/213 |
| 2005/0018885 | A1 * | 1/2005 | Chen et al. .................. 382/128 |

OTHER PUBLICATIONS

Tsai, Ming Dar, Hsieh, Ming-Shium and Jou, Shyan-Bin, "Virtual Reality Orthopedic Surgery Simulator," pp. 333-351, Apr. 12, 2001, Computers in Biology and Medicine 31 (2001) 333-351.

Hsieh, Ming-Shium, Tsai, Ming Dar, and Chang, Wen-Chien, "Virtual Reality Simulator for Osteotomy and Fusion Involving the Musculoskeletal System," pp. 91-101, Sep. 5, 2001, Computerized Medical Imaging and Graphics 26 (2002) 91-101.

Tsai, Ming Dar, Jou, Shyan-Bin and Hsieh, Ming-Shium, "Accurate Surface Voxelization for Manipulating Volumetric Surfaces and Solids With Application in Simulating Musculoskeletal Surgery," Oct. 16-18, 2001, Proceedings—Ninth Pacific Conference on Computer Graphics and Applications, pp. 234-243, IEEE Computer Society.

* cited by examiner

*Primary Examiner*—Joe H. Cheng
(74) *Attorney, Agent, or Firm*—Rabin & Berdo, P.C.

(57) ABSTRACT

A three-dimensional surgery simulation system is provided for generating a three-dimensional surgery simulation result of an anatomical part undergoing a simulated surgical procedure. The system includes a display unit, a three-dimensional visual imaging unit, a storage unit for storing a plurality of voxelized three-dimensional model image data sets, an input unit for controlling progress of the simulated surgical procedure, and a computing unit for computing the simulation result data in accordance with the voxelized three-dimensional model image data sets and under the control of the input unit, and for controlling the display unit to permit viewing of the surgery simulation result in three-dimensional form thereon by an operator wearing the visual imaging unit.

3 Claims, 10 Drawing Sheets

THREE-DIMENSIONAL SURGERY SIMULATION SYSTEM

CROSS-REFERENCE TO RELATED APPLICATION

This application claims priority of Taiwanese application no. 091119869, filed on Aug. 30, 2002.

BACKGROUND OF THE INVENTION

1. Field of the Invention

The invention relates to a surgery simulation system, more particularly to a three-dimensional surgery simulation system that facilitates simulation of various surgical procedures in a three-dimensional environment with relatively high accuracy and at a relatively low cost.

2. Description of the Related Art

With the on-going global advances in surgical knowledge and practice, medical school students, interns, or even senior surgeons need to continuously enrich their professional knowledge of surgical techniques and procedures so as to provide patients with the best and most up-to-date medical services.

In the field of orthopedics or plastic surgery, for instance, if surgery simulating equipment is not available to assist teaching and training of surgeons, it is not possible to predict the outcome of an operation with a certain degree of accuracy or to meet the expectations of the patient undergoing the operation. Accordingly, the outcome of the operation depends largely on the clinical experience of the surgeon. Moreover, an operation subjects the patient to high risks because the patient's body does not lend itself to a trial-and-error process. If the operation is not successful, a remedial operation may be needed, which is, again, without certainty of success.

Therefore, teaching hospitals and some medical institutions in general have included surgery simulations as part of their curriculums or training programs. Traditionally, surgery simulations are largely limited to two-dimensional paper simulations based on X-ray images. In recent years, various two-dimensional surgery visual simulating equipment have been proposed to permit input of a desired manipulation and to display a two-dimensional image of the simulation result on a display. However, due to topological changes in skeletal morphology, a two-dimensional model is not sufficient to depict the geometry of bone structures in a realistic manner. Therefore, there are considerable visual errors when viewing the two-dimensional model on the display. In addition, since the manipulation is limited by the two-dimensional image, and since the input information cannot adequately match the manipulation in an actual operation, the simulation result is expectedly low and unreliable. Such a simulation model is therefore not very helpful to students or trainees as a pre-operation simulation tool, and the simulation result is not reliable when predicting the outcome of an operation.

SUMMARY OF THE INVENTION

Therefore, the object of the present invention is to provide a three-dimensional surgery simulation system that facilitates simulation of various surgical procedures in a three-dimensional environment with relatively high accuracy and at a relatively low cost.

According to the present invention, there is provided a three-dimensional surgery simulation system for generating a three-dimensional surgery simulation result of an anatomical part undergoing a simulated surgical procedure. The system comprises:

a display unit;

a three-dimensional visual imaging unit adapted to be worn by an operator for viewing three-dimensional images on the display unit;

a storage unit for storing a plurality of voxelized three-dimensional model image data sets, including at least one of a pre-operation anatomical data set, a surgical instrument data set, an implant data set, and a simulation result data set;

an input unit adapted to be operated by the operator for controlling progress of the simulated surgical procedure; and a computing unit coupled to the display unit, the storage unit and the input unit, the computing unit computing the simulation result data in accordance with the voxelized three-dimensional model image data sets and under the control of the input unit, and controlling the display unit to permit viewing of the surgery simulation result in three-dimensional form thereon by the operator when the operator wears the visual imaging unit.

When the computing unit detects the surgery simulation result to have a first boundary face with a discontinuous edge that is common to at least a second boundary face, the computing unit processes the first and second boundary faces as a common closed surface, and assigns two voxels sharing the common closed surface as seeds for seed-and-flood algorithm computations during surface voxelization in the generation of the simulation result data.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
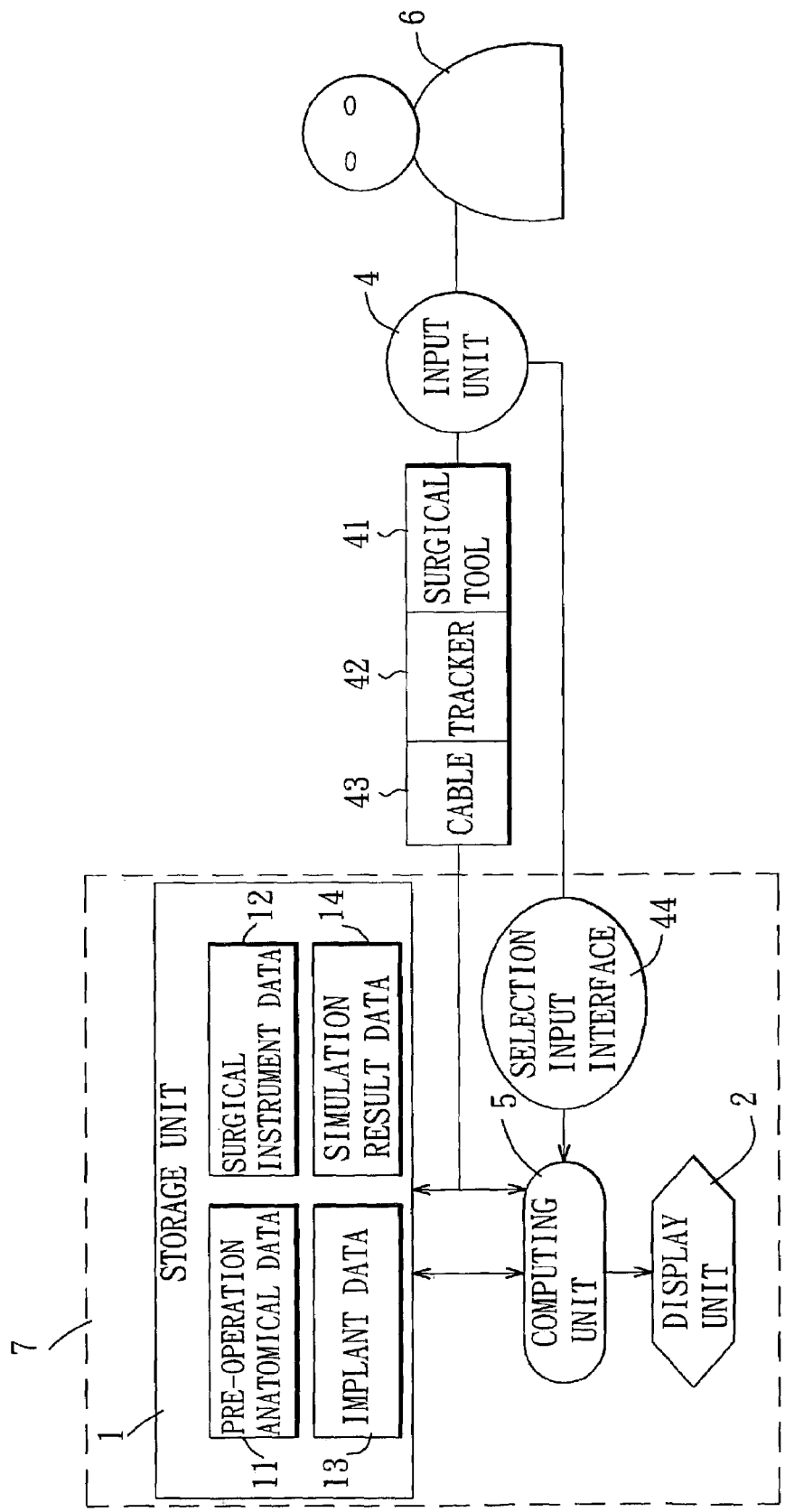
FIG. 1 is a block diagram illustrating the preferred embodiment of a three-dimensional surgery simulation system according to the present invention.
Figure 2:
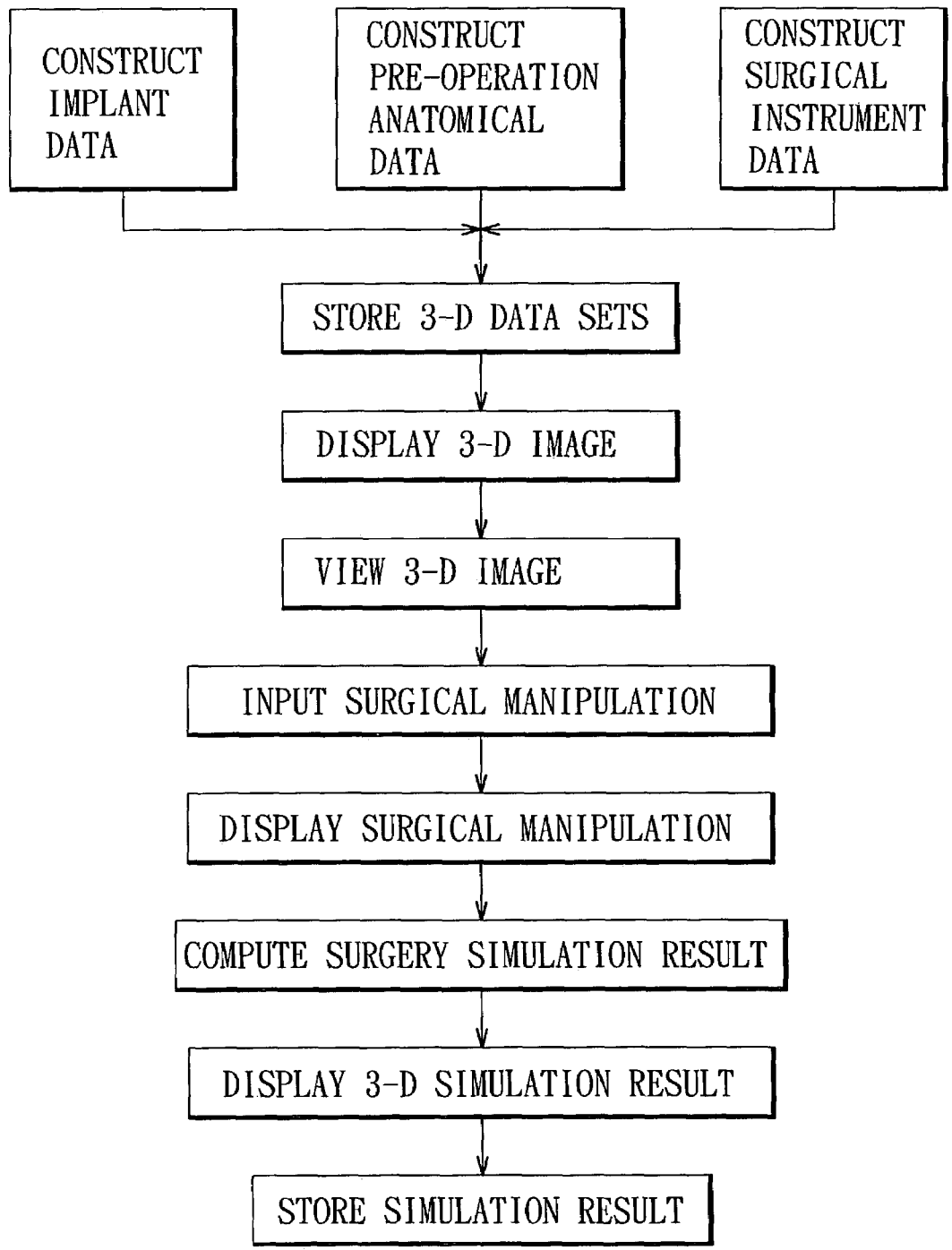
FIG. 2 is a flowchart to illustrate operation of the preferred embodiment.

Referring to FIGS. 1 to 3 and FIGS. 4a to 4g, the preferred embodiment of a three-dimensional surgery simulation system according to the present invention is shown to include a storage unit 1, a display unit 2, a three-dimensional visual imaging unit 3, an input unit 4, and a computing unit 5. The system is adapted to be operated by an operator 6 (such as an intern) to simulate a knee arthroplasty operation for replacing a damaged knee joint of a patient to be operated upon (hereinafter referred to as the patient) and for correcting a mal-positioned tibia. While the storage unit 1, the display unit 2 and the computing unit 5 in this embodiment correspond respectively to a hard disk, a display and a processing system (e.g., central processing unit and relevant chips) of a personal computer 7, they can be substituted by equivalent means or can be components of independent apparatuses. In addition, the present invention is applicable to other anatomical parts or tissues of the human body or animal body.

The storage unit 1 is disposed to store a plurality of voxelized three-dimensional model image data sets that are needed for reference, utilization and computation during surgical procedures. The data sets include a pre-operation anatomical data set 11, a surgical instrument data set 12, an implant data set 13, and a simulation result data set 14.

The pre-operation anatomical data set 11 refers to a set of three-dimensional model image data reconstructed by the computing unit 5 from two-dimensional images of an anatomical part of the patient, which is to undergo surgery (i.e., the knee of the patient in this embodiment), that are obtained using any medical image capturing device. In this embodiment, the two-dimensional images are a plurality of CT slices (24 slices in this embodiment) having a specific resolution (e.g., 256×256) and obtained of the patient's damaged knee by computerized tomography. The computing unit 5 is disposed to reconstruct the three-dimensional model images from the two-dimensional images and to simulate surgical procedures. Specifically, each three-dimensional model image is defined by a plurality of voxels (regularly positioned cuboids). By computing whether boundaries of voxels of a simulated sectioned part of a body form a closed area, whether the sectioned part is completely severed from the body can be determined. Based on this principle, various surgical procedures (to be described in further detail hereinafter) can be computed and simulated. Since the principle of computation is known in the art and is relatively complicated, a detailed description thereof is omitted herein for the sake of brevity. However, reference can be made to an article by the applicants, entitled "Diagnosis of herniated intervertebral disc assisted by 3-dimensional, multiaxial, magnetic resonance imaging" found in Formosan Med. Assoc. 98(5) (1999), and a paper entitled "Accurate surface Voxelization for manipulating volumetric surfaces and solids with application in simulating musculoskeletal surgery" and presented by the applicants during the Ninth Pacific Conference on Computer Graphics and Applications Convention held in Tokyo, Japan on October, 2001.

The surgical instrument data set 12 includes three-dimensional models of machines and instruments commonly used in surgical operations, which include bone saws and osteotomes for sectioning bones, virtual plates and staples for fixation, virtual dissectors and currectors for removing tumors, and a virtual hand for moving bones, bone grafts and prostheses. The construction of the surgical instrument data set 12 will be described in more detail in the paragraphs pertaining to the input unit 4.

The implant data set 13 is optionally pre-constructed in the storage unit 1 depending on requirements, and includes three-dimensional models of implants to be implanted into anatomical parts that are to be operated upon at specific positions, such as the aforesaid bone grafts and prostheses. The implants are first designed by using an AutoCAD system or any other three-dimensional model plotting software according to predetermined parameters, and then converted to three-dimensional voxelized structures so as to facilitate processing and computation thereof together with the data sets 11, 12.

The simulation result data set 14 includes results of surgery simulations computed by the computing unit 5 based on the specified manipulation inputted through the input unit 4, in combination with the aforesaid pre-operation anatomical data set 11 and the surgical instrument data set 12 and/or implant data set 13. Further details will be described in the paragraphs dedicated to the computing unit 5.

The three-dimensional model image data sets stored in the storage unit 1 can be displayed on the display unit 2 in three-dimensional image form through the use of relevant software and hardware, such as a graphics accelerator card, of the personal computer 7. In this embodiment, the three-dimensional visual imaging unit 3 is a pair of conventional shutter glasses to be worn by the operator 6 for viewing the three-dimensional images on the display unit 2.

In this embodiment, the input unit 4 includes a surgical tool 41 selected from the aforesaid surgical machines and instruments, and a tracker 42 releasably coupled to a front end of the surgical tool 41. The tracker 42 is connected to the personal computer 7 by a signal transmission cable 43 at a specific position. After selecting the appropriate surgical tool 41, the input unit 4 is held by the operator 6 against the display unit 2 such that the tracker 42 at the front end of the surgical tool 41 is in direct contact with the surface of a screen 21 of the display unit 2. The input unit 4 is then moved across the surface of the screen 21 according to the desired manipulations (including position, track and angle of the tracker 42 and magnitude of applied force). The position, track and angle of the tracker 42 relative to coordinates of a virtual space (not shown), together with the dimensions (e.g., length), are sent to the personal computer 7 via the cable 43 for computation by the computing unit 5 with reference to the three-dimensional model image data sets 11, 12, 13 stored in the storage unit 1 and for construction of the relative positions of the three-dimensional model image of the surgical tool 41 and the associated three-dimensional model image data sets 11, 13, as well as the states of contact of the surgical tool 41 during a simulated surgical procedure. The tracker 42 has a force sensor (not shown) disposed therein to detect a counter force (equivalent to the magnitude of the force applied by the operator 6) from the screen 21 when the operator 6 applies an appropriate amount of force on the tracker 42 to bring the latter into contact with the screen 21. The value of the magnitude of the applied force is also sent to the personal computer 7 to serve as one of the parameters based on which the computing unit 5 operates (e.g., a greater force indicates a deeper cut into the bone or tissue).

Figure 3:
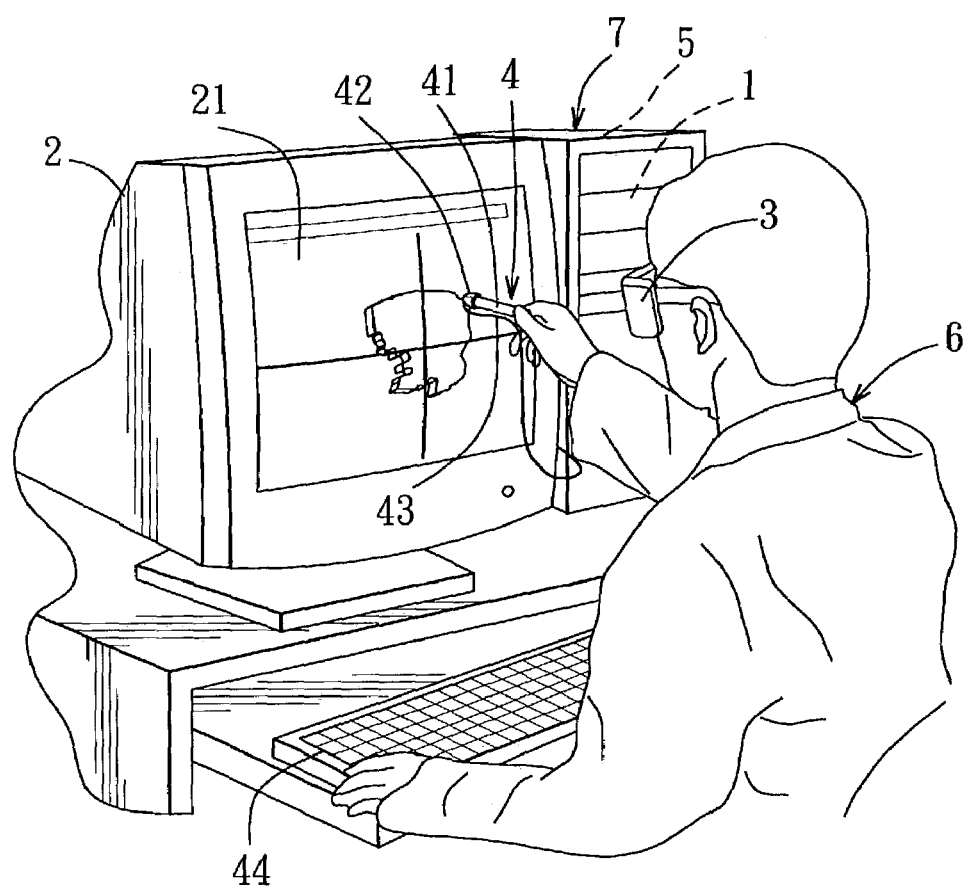
FIG. 3 is a schematic view of the preferred embodiment in a state of use, illustrating an operator wearing shutter glasses to view a three-dimensional model image shown on a display unit and inputting a manipulation through an input unit.

The input unit 4 provides a selection input interface 44, which, in this embodiment, is a keyboard operable using the left hand of the operator 6, as shown in FIG. 3. The selection input interface 44 cooperates with a downward-scroll menu at the upper left corner of the screen 21 of the display unit 2 to permit selection of various surgery simulating functions, adjustment of brightness and contrast of the screen 21, altering of model material parameters, and loading of the implant data set 13 from the AutoCAD system into the surgery simulation system of this invention.

The computing unit 5 is mainly used in computing and constructing the three-dimensional model images of the pre-operation anatomical data set 11, the surgical instrument data set 12 and the implant data set 13. According to the three-dimensional model images thus constructed and the information pertaining to the desired manipulations (including the position, track and angle of the tracker 42, and the magnitude of the applied force) inputted by the operator 6 through the input unit 4, the computing unit 5 obtains through computations a three-dimensional surgery simulation result of the anatomical part of the patient undergoing the desired manipulations. The surgery simulation result is then outputted by the computing unit 5 for displaying on the display unit 2 in order to allow the operator 6 to observe the surgery simulation result. In this embodiment, the computing unit 5 provides various simulation functions directed to various forms of sectioning commonly employed in clinical orthopedic surgeries and topological changes in the tissues of the anatomical part to undergo surgery, including:

Sectioning: cutting a joint using a bone saw in arthroplasty;

Recognition: determining whether the sectioned structure is completely detached from the original skeleton;

Removal: removing a part of the skeletal structure to accommodate prosthesis;

Repositioning: repositioning a structure to correct skeletal morphology; and

Fusion determining: determining state of fusion of a repositioned skeletal structure with the original tissue structure.

As described hereinabove, the computing unit 5 utilizes three-dimensional model computations to construct and simulate, and the resultant three-dimensional model image is defined by the plurality of voxels. When the present invention is employed to simulate a musculosketal system, a boundary pointer is used to represent and simulate boundary changes of skeletal structures and soft tissues, and values of the voxels are normalized so as to be independent of tissue type. With the voxel values normalized, repositioning of the bone structures and soft tissues will not influence the values of the surrounding voxels. Therefore, contents of the voxels can be changed to simulate various surgical procedures. Thus, the system of this invention can compute changes of soft tissues together with the bones, simulate sectioning, recognition, translation, rotation, and removal of anatomic structures along arbitrary directions, and simulate fusion and healing of bones and soft tissues.

Take the sectioning procedure as an example. When a bone saw is used to cut a bone structure at two positions, the computing unit 5 will generate two swept surfaces of the surgical tool 41, compute intersections between voxels of the bone structure and the two swept surfaces, and change boundary pointers and values of the voxels at the intersections to represent the section.

After the simulated sectioning procedure, if the operator 6 wants to move or remove the structure, the computing unit 5 first implements the recognition computation. In this embodiment, a seed and flood algorithm is used to find the voxels inside a set of sectioned boundaries. If the boundaries of the sectioned structure do not form an enclosed area, the computation will flood out of the side of the structure that is still connected to the skeleton.

By interchanging the contents of the voxels at an initial position and a predetermined new position, translation of the sectioned structure can be simulated. Simulation of rotation also works according to a similar principle. Removal of the sectioned structure can be simulated by deleting the contents of the voxels thereof. When the structure is repositioned, the computing unit 5 will detect whether bone voxels are present between the initial position and the predetermined new position of the structure so as to perform a collision test.

To simulate fusion of two structures, the operator 6 needs to specify fusion surfaces on the two structures to be fused. The computing unit 5 generates callus bone voxels between the fusion surfaces, and the two structures are recognized to be one continuous structure.

To simulate healing, the operator 6 needs to specify healing surfaces on the two soft tissues to be healed. The computing unit 5 will generate soft tissue voxels between the healing surfaces, and recognizes the two soft tissues as being a continuous structure.

In the present invention, when the computing unit 5 detects the surgery simulation result to have a first boundary face with a discontinuous edge that is common to at least a second boundary face, the computing unit 5 processes the first and second boundary faces as a common closed surface, and assigns two voxels sharing the common closed surface as seeds for seed-and-flood algorithm computations during surface voxelization in the generation of the simulation result data. In the preferred embodiment, the computing unit 5 is configured to record the first and second boundary faces and any discontinuous edge therein in corresponding node lists. When the computing unit 5 detects a common edge relationship between the discontinuous edge of the first boundary face and the second boundary face, the node lists for the first and second boundary faces are merged by the computing unit 5 to create a new node list. The computing unit 5 is further configured to determine continuity of the boundary faces in the surgery simulation result in accordance with a new boundary face contained in the new node list. The computing unit 5 designates the new boundary face as a continuous face when edges of the new boundary face are determined by the computing unit 5 to be continuous.

Based on the foregoing description of the system according to this invention, and with reference to FIGS. 4a to 4g, the steps and results of the simulation of a knee arthroplasty using the present invention will now be explained in the succeeding paragraphs.

Figure 4A:
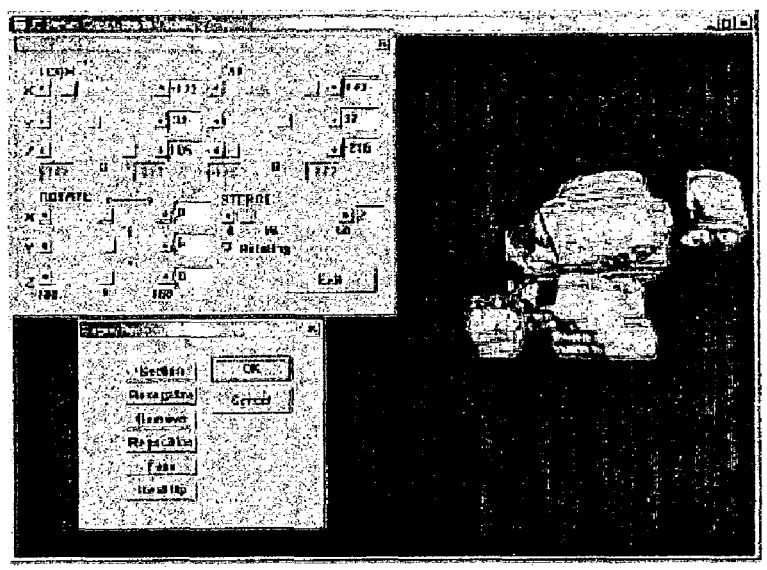
FIGS. 4a to 4g illustrate a set of exemplary simulation results shown on the display unit of the preferred embodiment.

FIG. 4a shows a proximal tibia that is sectioned by a bone saw, i.e., the result of employing the aforesaid "sectioning" procedure. A downward-scroll menu for selection and input by the operator 6 is shown at the upper left corner of the figure.

Figure 4B:
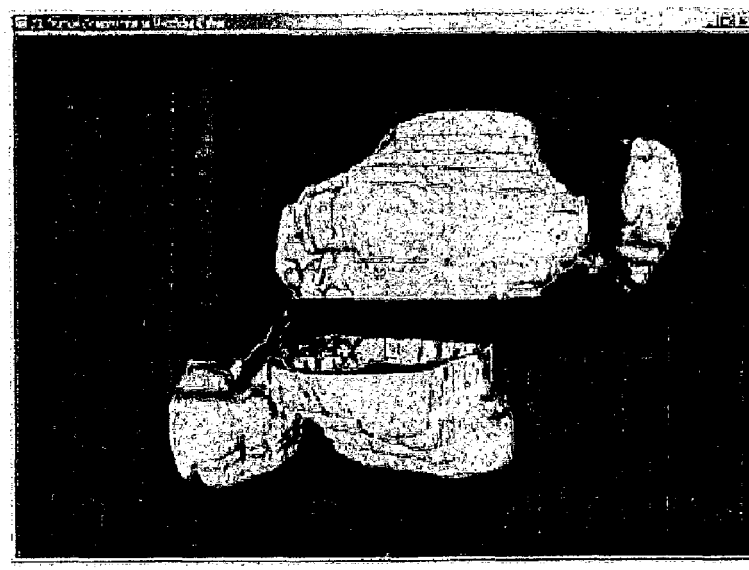

FIG. 4b shows two flat sections on the femur and tibia, respectively, to remove a near flat bone fragment of the femur and a wedge-shaped fragment of the tibia, i.e., the result of employing the "recognition" and "removal" procedures. A hand (i.e., a virtual instrument) is also shown to reposition the tibia.

Figure 4C:
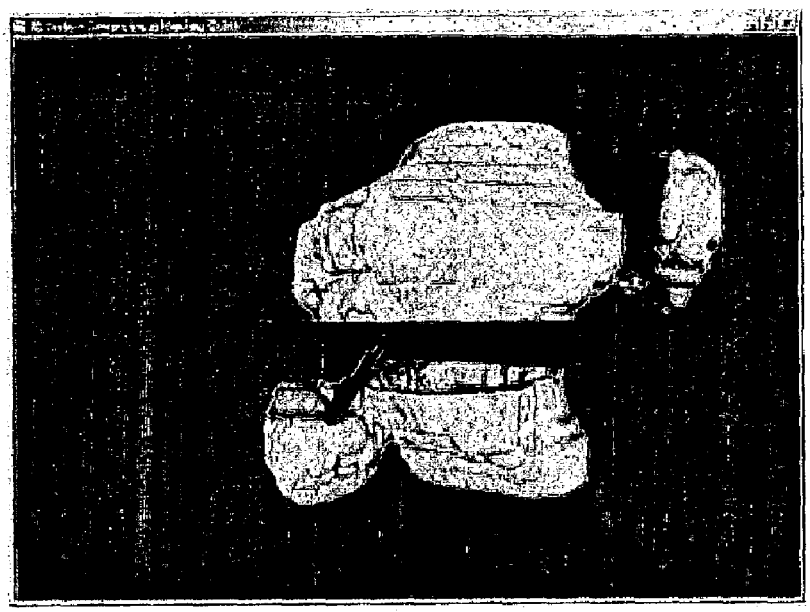

FIG. 4c shows that the tibia is moved to a new position by the virtual hand to correct the mal-position thereof, i.e., the result of employing the "repositioning" procedure.

Figure 4D:
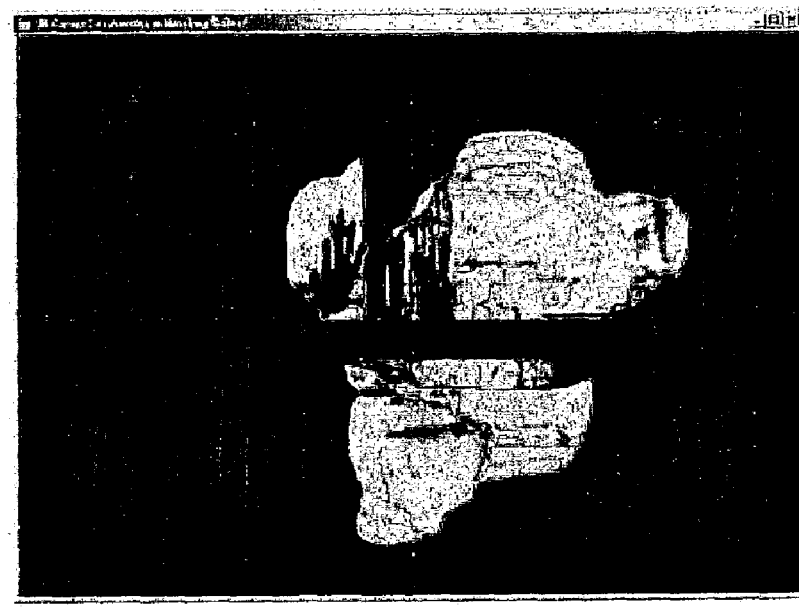

FIG. 4d shows that a vertical bone fragment was sectioned away so that the femur can accommodate the posterior of the prosthetic femur, the bone fragment being moved by the virtual hand.

Figure 4E:
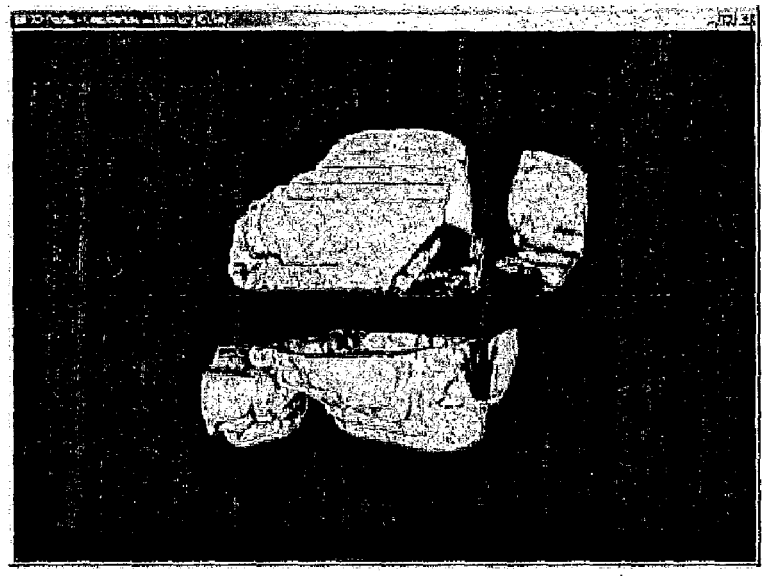

As shown in FIG. 4e, a vertical bone fragment and an oblique bone fragment are sectioned away such that the femur can accommodate the anterior of the U-shaped prosthetic femur. An oblique section on the posterior of the femur is sectioned away for accommodating the U-shaped prosthetic femur. An oblique section on the patella is sectioned away to accommodate the prosthetic patella.

Figure 4F:
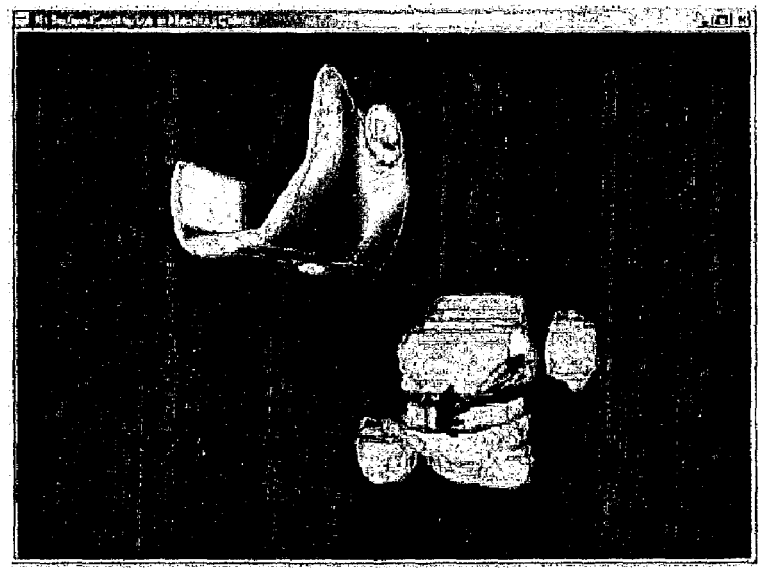

FIG. 4f shows that the prosthesis has been recognized as three separate structures: a curved femur part, a disk-like tibia part, and a dome-like patella part. The tibia part has been repositioned for insertion into the tibia by the virtual hand. As shown, the dome of the prosthetic patella is inside the groove of the prosthetic femur and the prosthetic tibia, and the prosthetic tibia matches the tibia plateau.

Figure 4G:
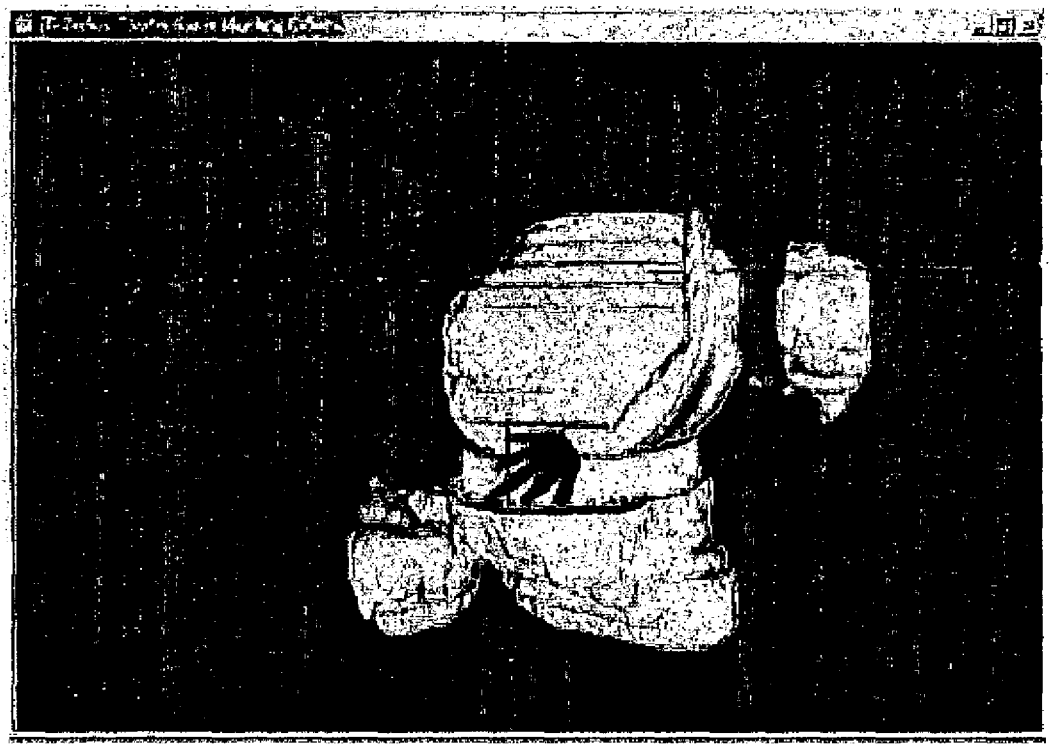

FIG. 4g shows that the U-shaped prosthetic femur has been repositioned for insertion into the femur. The prosthetic patella has been inserted into the patella, but cannot be observed from the outside since it is concealed within the patella. The prosthetic femur can match the residual femur properly, which indicates that the sectioning of the tibia was appropriate. As the U-shaped curve of the prosthetic femur is well within the groove of the prosthetic tibia, the prosthetic femur and tibia are considered to be well-positioned.

Figure 5A:
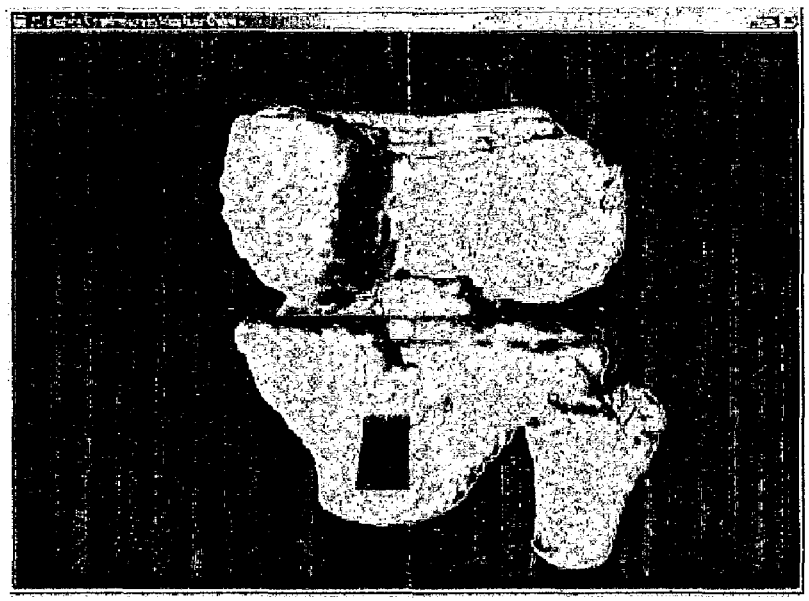
FIGS. 5a to 5f illustrate another set of exemplary simulation results shown on the display unit of the preferred embodiment.
Figure 5B:
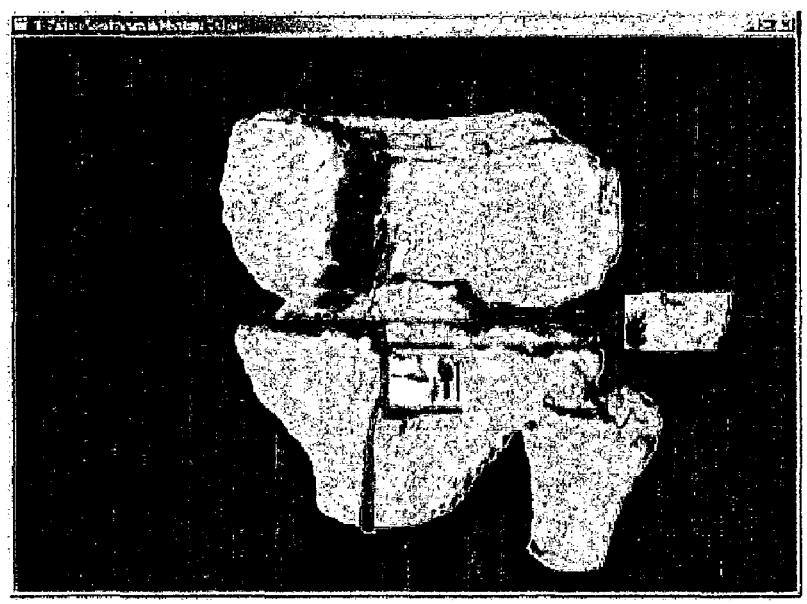
Figure 5C:
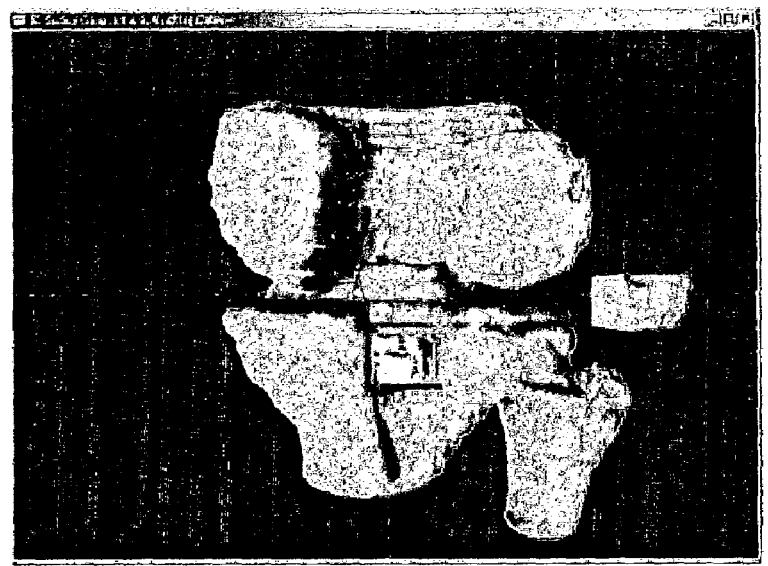
Figure 5D:
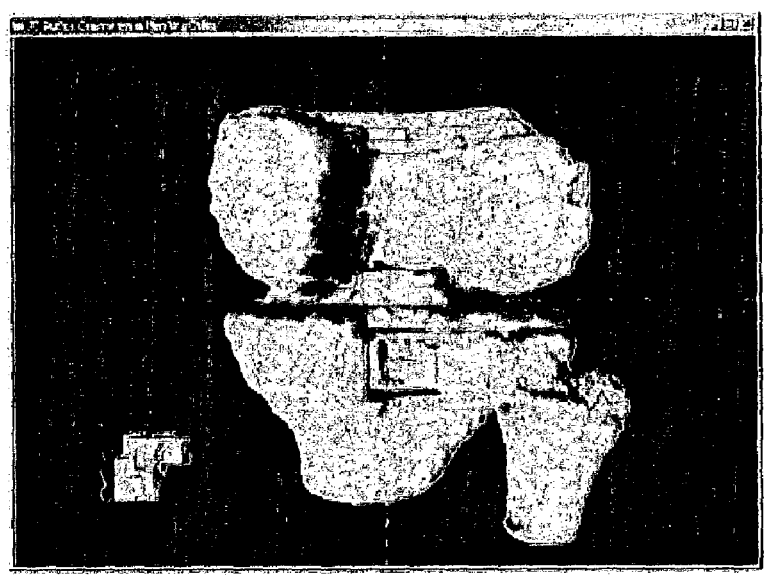
Figure 5E:
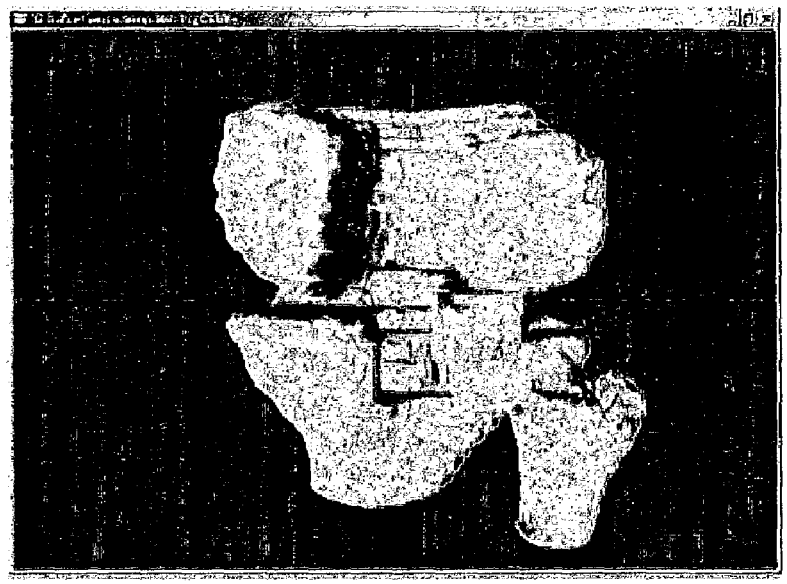
Figure 5F:
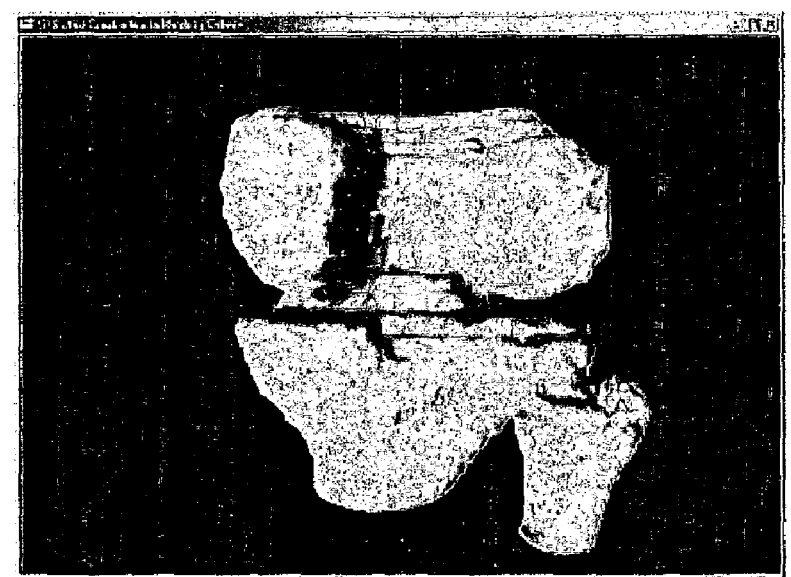

FIGS. 5a to 5f illustrate simulation results when the present invention is used to remove a tumor inside the tibia. Referring to FIG. 5a, the proximal tibia is shown to be sectioned by a virtual saw. In FIG. 5b, a window-shaped bone fragment is shown to have been sectioned away from the tibia and repositioned by a virtual hand. FIG. 5c shows that the tumor is dissected by a virtual dissector. FIG. 5d shows that a graft bone is held by the virtual hand in preparation for filling the space of the resected tumor. In FIG. 5e, the graft bone is planted in the space of the resected tumor, and the window-shaped bone fragment, which has been sectioned away, is repositioned at its original position. FIG. 5f shows the result of fusion of the repositioned window-shaped bone fragment and the tibia.

In view of the foregoing, the three-dimensional surgery simulation system according to the present invention has the following salient advantages:

1. Since the operator can simulate surgical procedures in a three-dimensional environment which approximates the real world, the coordination between the operator's hand that holds the selected surgical instrument and his/her visual judgment during simulated manipulations, including the position, track and angle of the surgical instrument, as well as the magnitude of the applied force, is very close to that in actual surgical procedures. Therefore, the operator can achieve better and more effective training.

2. Furthermore, the use of three-dimensional model images in surgery simulation enables the operator to have a better spatial perception of changes in skeletal morphology and thus achieve better manipulations in actual surgical procedures. Thus, this invention is useful as a pre-operation training tool.

3. In addition to providing a three-dimensional or stereographic environment, this invention offers various simulation modes, including sectioning, fusion, removal, recognition and repositioning, to help train the operator in different surgical procedures.

4. This invention requires mainly a personal computer with a window interface, and is therefore simple in construction. The three-dimensional visual imaging unit 3 and the input unit 4 are easy and convenient to use.

5. As the storage unit, the display unit and the computing unit are standard components of the personal computer, and as the three-dimensional visual imaging unit 3 and the input unit 4 are also relatively low-cost, this invention is on the whole inexpensive and convenient to install, and can be widely applied for both educational and training purposes.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A three-dimensional surgery simulation system for generating a three-dimensional surgery simulation result of an anatomical part undergoing a simulated surgical procedure, comprising:
a display unit;
a three-visual imaging units adapted to be worn by an operator for viewing three-dimensional images on said display unit;
a storage unit for storing a plurality of voxelized three-dimensional model (x,y,z coordinate) image data sets, including at least one of a pre-operation anatomical data set, a surgical instrument data set, an implant data set, and a simulation result data set;
an input unit adapted to be operated by the operator for controlling progress of the simulated surgical procedure; and
a computing unit coupled to said display unit, said storage unit and said input unit, said computing unit computing the simulation result data in accordance with said voxelized three-dimensional model image data sets and under the control of said input unit, and controlling said display unit to permit viewing of the surgery simulation result in three-dimensional form thereon by the operator when the operator wears said visual imaging unit;
wherein, when said computing unit detects the surgery simulation result to have a first boundary face with a discontinuous edge that is common to at least a second boundary face, said computing unit processes the first and second boundary faces as a common closed surface, and assigns two voxels sharing the common closed surface as seeds for seed-and-flood algorithm computations during surface voxelization in the generation of the simulation result data, and
wherein the computing unit transforms a specified rotation center to a boundary voxel of one endmost column with minimax x, y coordinates by transforming an anatomical structure and then computing a new place of the boundary voxel with opposite x, y coordinates, approximating a rotation by a shear.

2. The three-dimensional surgery simulation system of claim 1, wherein said computing unit is configured to record the first and second boundary faces and any discontinuous edge therein in corresponding node lists, said computing unit merging the node lists for the first and second boundary faces to create a new node list when said computing unit detects a common edge relationship between the discontinuous edge of the first boundary face and the second boundary face, said computing unit being further configured to determine continuity of the boundary faces in the surgery simulation result in accordance with a new boundary face contained in the new node list.

3. The three-dimensional surgery simulation system of claim 2, wherein said computing unit designates the new boundary face as a continuous face when edges of the new boundary face are determined by said computing unit to be continuous.

* * * * *